(12) United States Patent
Kolokowsky

(10) Patent No.: US 7,149,840 B1
(45) Date of Patent: Dec. 12, 2006

(54) UNIVERSAL SERIAL BUS INTERFACE TO MASS STORAGE DEVICE USING SPECULATIVE WRITE COMMANDS

(75) Inventor: Stephen Henry Kolokowsky, San Diego, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 158 days.

(21) Appl. No.: 11/038,903

(22) Filed: Jan. 18, 2005

Related U.S. Application Data

(63) Continuation-in-part of application No. 10/796,872, filed on Mar. 8, 2004.

(60) Provisional application No. 60/457,879, filed on Mar. 25, 2003.

(51) Int. Cl.
*G06F 13/00* (2006.01)

(52) U.S. Cl. .............. 710/313; 710/315; 710/62; 712/207

(58) Field of Classification Search ........ 710/305–315, 710/62–66; 712/207
See application file for complete search history.

(56) References Cited

U.S. PATENT DOCUMENTS

| | | | | |
|---|---|---|---|---|
| 5,828,854 | A * | 10/1998 | Wade | 710/315 |
| 6,199,122 | B1 * | 3/2001 | Kobayashi | 710/36 |
| 6,505,267 | B1 * | 1/2003 | Luke et al. | 710/315 |
| 6,618,788 | B1 * | 9/2003 | Jacobs | 710/315 |
| 7,010,638 | B1 * | 3/2006 | Deng et al. | 710/306 |
| 7,054,980 | B1 * | 5/2006 | Wurzburg | 710/305 |
| 7,073,010 | B1 * | 7/2006 | Chen et al. | 710/313 |

OTHER PUBLICATIONS

*Universal Serial Bus Mass Storage Class Specification Overview Revision 1.2* USB Implementers Forum Jun. 23, 2003 pp. 1-7.
*Universal Serial Bus Mass Storage Class Bulk-Only Transport Revision 1.0* USB Implementers Forum Sep. 31, 1999 pp. 1-22.
*Universal Serial Bus Mass Storage Class Control/Bulk/Interrupt Revision 1.0* USB Implementers Forum Dec. 14, 1998 pp. 1-26.
*CY4611—FX2 USB to ATA/CF Reference Design Notes* Cypress Semiconductor Corporation Nov. 2000-Jul. 2002 pp. 1-7.
*CY7C68013 EZ-USB® FX2™ USB Microcontroller High-Speed USB Peripheral Controller* Cypress Semiconductor Corporation Jun. 21, 2002 pp. 1-50.
*Advanced Technology Attachment ATA-2* From: PC Guide.com Jan. 2003 pp. 1-14.
*ATA Short for Advanced Technology Attachment* From: Webopedia.com Jan. 2003 p. 1.
*Serial ATA Interface on Client Systems* Tom Pratt, Dell Computer Corporation Jun. 2003 pp. 1-4.
*CY7C68300A Revision *B* Cypress Semiconductor Corporation pp. 4 and 11.
*EZ-USB FX2 Technical Reference Manual Version 2.1* Cypress Semiconductor Corporation Copyright 2000, 2001 pp. 1-130.
*Universal Serial Bus Specification Revision 2.0* USB Implementers Forum Apr. 27, 2000 pp. Title Page-ii, 1-83 and 195-296.

* cited by examiner

*Primary Examiner*—Christopher Shin
(74) *Attorney, Agent, or Firm*—Marger Johnson & McCollom, P.C.

(57) ABSTRACT

An improved USB to ATA bridge circuit that issues a speculative write command upon the completion of an actual write command: The speculative write command assumes that the next write command will write data in a the next sequential data location to that in which data was written by the preceding write command. When the next actual write command is received, the address to which data is to be written is compared to the address used by the speculative write command, if the addresses match, the data is written when the storage device is ready. If the addresses do not match the data transfer is started and immediately stopped.

20 Claims, 5 Drawing Sheets

UNIVERSAL SERIAL BUS INTERFACE TO MASS STORAGE DEVICE USING SPECULATIVE WRITE COMMANDS

RELATED APPLICATIONS

This application is a continuation-in-part, and claims priority from, U.S. application Ser. No. 10/796,872 filed Mar. 8, 2004, which in turn claims priority from provisional application Ser. No. 60/457,879 filed Mar. 25, 2003.

The entire content of application Ser. Nos. 10/796,872 and 60/457,879 is hereby incorporated herein by reference.

FIELD OF THE INVENTION

This invention relates to computer systems, and more particularly to interface devices which connect storage devices to a host computer system.

BACKGROUND OF THE INVENTION

An important aspect of any computer system is the interface between the computer and external devices. In many situations, the various units which work together to form a complete computer system are manufactured by more than one company or organization. The definition of standard interfaces therefore has been an important activity of the computer industry. Many interfaces have been defined by various standards committees. Frequently, these interfaces are in a relatively constant state of improvement.

Two of the important interfaces which have been defined by standards committees and which are in widespread use are:

1) The IDE/ATA interface: IDE stands for "Integrated Device Electronics" and ATA stands for "Advanced Technology attachment". This interface is often referred to as the ATA interface and the IDE/ATA interface will herein be referred to as the ATA interface.
2) The USB interface: USB stands for "Universal Serial Bus" and it is coming into widespread use.

The ATA interface is frequently used to connect mass storage devices such as hard disk drives and optical disk drives to personal computers. Several versions of the ATA interface have been defined. The latest standard is the ATA-7 standard which is also referred to as the Ultra-ATA/133 standard. The standards are published on the Internet and a link to them can be found on the web site of the International Committee for Information Technology Standards (INCITS) under the committee "T13 AT storage Interface", and "T10 SCSI Storage Interface".

The USB interface was designed to be an easy-to-use interface for personal computers. The USB interface can be used with a wide variety of different types of peripheral devices. The USB interface therefore eliminates the need for multiple I/O standards and it simplifies PC connectivity. There have been a number of versions of the USB standard and the most recent version is designated USB 2.0. The USB interface is described in a document entitled "Universal Serial Bus Revision Specifications 2.0" which is publicly available on the web site of the "USB Implementers Forum" and elsewhere.

A "bridge" is a device which allows two interfaces to communicate with each other. For example, a bridge can be used to interface a USB bus to an ATA bus. With a USB to ATA bridge, one can connect a mass storage device (such as a hard disk drive), which has a native ATA interface to a PC through an external USB bus.

Prior application Ser. No. 10/796,872 describes an improved USB to ATA bridge that eliminates some of the delay inherent in read operations performed by prior art USB to ATA bridges. The present invention provides an improved USB to ATA bride that eliminates some of the delay between successive write commands in prior art USB to ATA bridges.

In prior art USB to ATA bridges, the process to write data on a mass device can, for example, include the following steps:

1) The host issues a command block wrapper (CBW) on the USB bus that includes a write command.
2) The USB-ATA bridge issues an ATA write command to the storage device.
3) The storage device processes the command. This generally involves a delay in the order of 300 to 400 microseconds. During this period the host will be ready to send data, but the data transfer is delayed until the storage device is ready to receive the data.
4) When the storage drive is ready the data is transferred to the storage device.
5) The storage device indicates that the operation has been successful.
6) The host gets the next piece of data which involves a 300 to 400 microsecond delay.
7) The host issues the next CBW with another write command.

The present invention is direct to eliminating some of the delay involved when a USB to ATA bridge issues a series of write commands.

SUMMARY OF THE PRESENT INVENTION

The present invention provides an improved USB to ATA bridge circuit that issues a speculative write command upon the completion of an actual write command. The speculative write command assumes that the next write command will write data in the next sequential data location to that in which data was written by the preceding write command. When the next actual write command is received, the address to which data is to be written is compared to the address used by the speculative write command. If the addresses match, the data is written when the storage device is ready. If the addresses do not match, the data transfer is started and immediately stopped in an error condition. When the storage device detects the error condition, it will terminate the data transfer mode and be in condition to accept another write command. The bridge will then issue the write command to the location specified in the actual write command. On a statistical basis, time will be saved since most write commands write to sequential locations.

DETAILED DESCRIPTION

Figure 1:
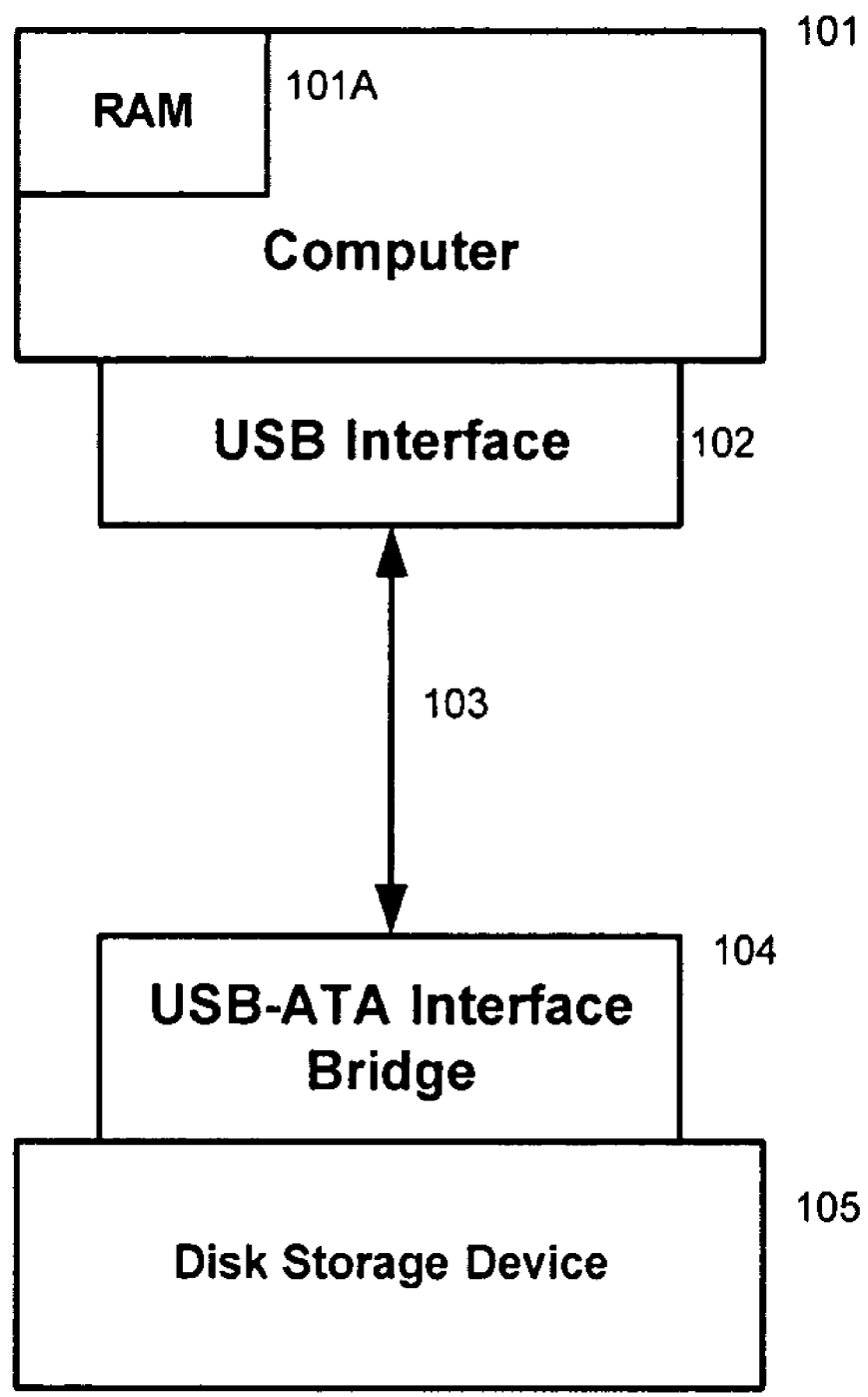
FIG. 1 is an overall diagram of a preferred embodiment of the invention.

A first preferred embodiment of the invention is illustrated in FIG. 1. The embodiment shown in FIG. 1 includes a host computer 101 and a disk storage device 105. The host computer 101 includes a RAM memory 101A that has programs and data stored therein. The host 101 includes a USB interface 102. This can, for example, be what is known as a USB 2.0 interface. The USB interface 102 is connected to a USB cable 103. The host 101, the USB interface 102, the cable 103 and the disk storage device 105 are conventional. The disk storage device 105 may be a hard drive, which stores data magnetically, or an optical disk drive such as a CD drive or a DVD drive.

The disk storage device 105 is connected to a USB-ATA interface 104 that is in turn connected to USB cable 103. The USB-ATA interface 104 is a bridge between the USB protocol and the ATA protocol. The present invention is directed to improvements in the USB-ATA bridge interface 104.

Herein the term "actual write command" will be used to refer to a command issued by host 101. The terms "speculative write command" will be used to describe a command issued by the bridge interface 104 in anticipation of receiving an actual command from the host 101.

With the present invention, the time required to execute a series of write commands is minimized. The commands involved are those defined in the publicly available USB specifications. The publicly available "Universal Serial Bus Revision Specifications 2.0" specifications is hereby incorporated herein by reference.

Two delays that occur in the prior art USB-ATA bridges are relevant to the present invention. The first delay is the delay between when a host receives an operation complete signal and when the host issues the next write command. The second delay is the delay between when an ATA storage device receives a write command and when the storage device is ready to receive data. With the present invention, the two delays described above can be made to occur during substantially the same time period, thereby eliminating all (or at least some part) of one of the delays.

With the present invention, as soon as the storage device 105, completes the execution of an actual write command, the bridge 104 issues a speculative write command which directs a write operation to the location, next in sequence, to the location in the preceding actual write command. Usually, (but not always) successive actual write commands write to successive locations on the storage device. Thus, on a statistical basis the speculative storage command will begin the operation of writing to the correct location, and, as will be explained, this accelerates execution of the next actual storage command.

If it turns out that the successive actual storage command has a different address than that used by the speculative write command, the speculative write command is terminated or aborted. The bridge accomplishes this by starting a data transfer command, and then immediately pausing the operation in an error condition. When the storage device detects the error condition, the drive leaves the data transfer state. The bridge can then issue the correct write command.

The details of the USB-ATA interface 104 will be explained with references to FIGS. 2, 3A, 3B and 4. First, the sequence of operation performed by interface 104 will be explained with references to FIG. 2. Then the timing of the various operations will be explained with reference to FIGS. 3A and 3B. Finally the structure of the interface will be explained with reference to FIG. 4.

Figure 2:
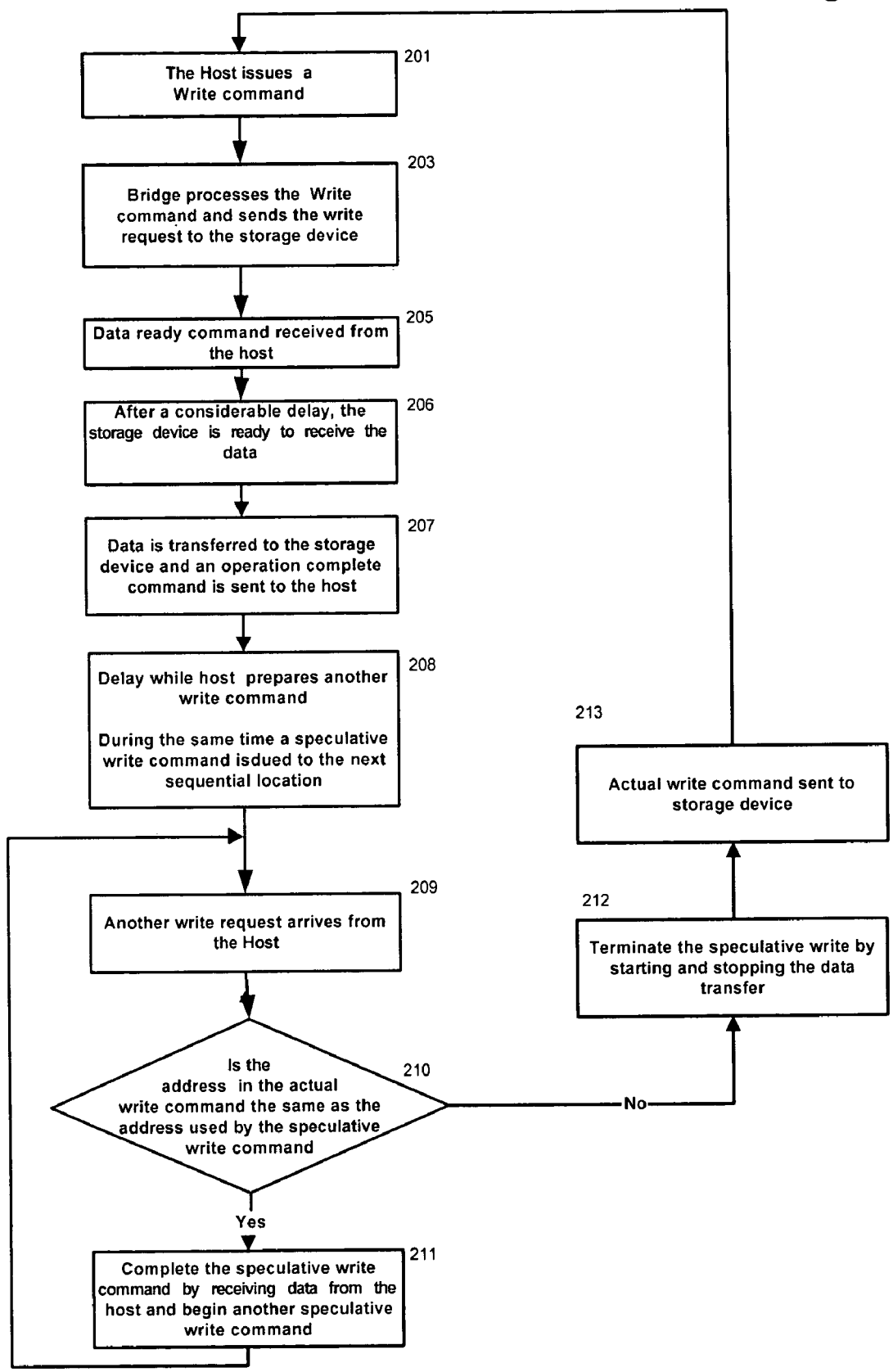
FIG. 2 is a block flow diagram.

As indicated by block 201 in FIG. 2, the process begins when the host 101 issues a CBW with a data write command. As indicated by block 203, the bridge 104 processes this command in a conventional manner and sends an ATA write command to the storage device 105.

Some time after the write command has been issued, the host will issue a data ready command as indicated by block 205. The time between when the host issues the write and the data ready commands is relatively short compared to the amount of time required by the storage device to process the write command and be ready to receive the data. When the storage device is ready to receive the data, the data is transferred as indicated by block 207. When the data transfer is complete, the storage device issues an operation complete command.

At this point there is a delay while the host gets ready to issue another actual write command. However, without waiting for another actual write command from the host, the bridge issues a speculative write command as indicated by block 208.

Some time later another write command is received from the host as indicated by block 209. At this point, the bridge 104 compares the address in the just received actual write command to the address in the previously issued speculative write command. As indicated by block 211, if the addresses are the same (as will be the situation in most cases) the speculative write command is completed by storing the data provided by the actual write command.

As indicated by block 211, if the address in the speculative write command differs from the address specified by the actual write command, the bridge terminates the speculative write command. This is done by starting to transfer data over the ATA interface and immediately stopping the operation in an error condition. When the storage device detects the error condition, it immediately leaves the data transfer mode and it is ready to receive another write command. The bridge 104 then issues the actual write command to the bridge as indicated by block 213. When this sequence of events occurs, no time has been saved.

After the actual write command has been executed, the bridge waits for the host to issue another write command as indicated by block 201 and the operation can be repeated.

As can be seen from the flow diagram in FIG. 2, the speculative write command only proceeds to competition if successive write commands are to sequential locations. If the next actual write command, issued after a speculative write command has been issued, writes to a different location than the location used by the speculative write command, the speculative write command is aborted.

On a statistical basis, in most cases, successive write commands, write to successive memory locations. Thus, on a statistical basis, the use of speculative write commands will reduce delay. The actual amount of time saved will depend on the particular application being executed by the host 101, in that different applications use different patterns of storage locations.

Figure 3A:
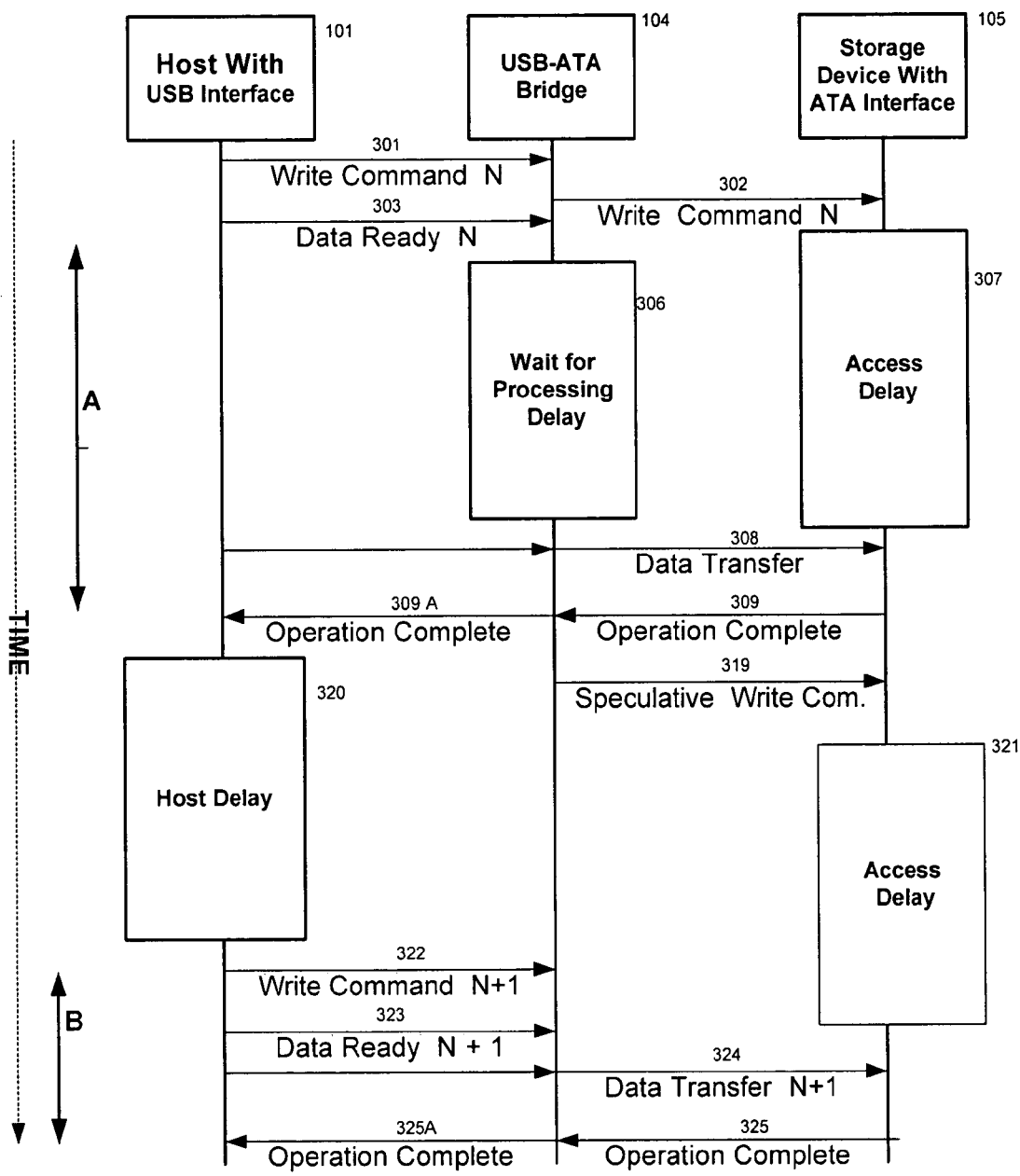
FIG. 3A is a timing diagram illustrating operations that occur when a speculative write command is successful.

FIG. 3A is a timing diagram illustrating the time periods involved in a write operation in the system shown in FIG. 1. It should be understood that the time periods shown in FIG. 3A are not to scale. The time periods shown were selected for ease of illustration and clarity of explanation and they are not intended to represent actual time periods to scale.

The write command illustrated in FIG. 3A is a conventional write command. The write command is issued by a host system using a CBW and it is transformed by the bridge in a conventional manner into an ATA write command.

Similarly, the data ready signals (such as the signal indicated by the arrow 303), the data transfer operations (for example data transfer indicated by the arrow 308), and the operation complete signals (such as operation complete signal indicated by the arrow 308) are conventional commands and signal.

As indicated by arrows 301 and 302, when the host issues a write command on the USB link 103, the bridge 104 processes this command and, after a short processing delay, the bridge 104 issues a corresponding ATA command to the storage device 105. A short time later, the host will indicate that it has data ready to transfer.

After the storage device 105 receives the write command 302, the storage device 105 requires a relatively long time (300 to 400 microseconds) to put itself in a state where it is ready to receive data. The actual amount of delay depends on the characteristics of the particular storage device, and the amounts given above are only representative. The bridge waits as indicated by block 306 and it does not begin transferring data to the storage device until the storage device 105 is ready to receive the data. In FIG. 3A, the delay required by the storage device is indicated by the block 307.

When the storage device is ready to receive the data the data is transferred as indicated by the arrow 308. When the transfer is complete, an operation complete signal is sent to the bridge 104 and to the host 101.

At this point, the host 101 requires some time in order to prepare another write request. In FIG. 3A this delay is indicated by block 320. However, without waiting for a write request from the host, the bridge 104 issues a speculative write command as indicated by the arrow 319. This speculative write is to the address that next follows the address in the write command indicated by the arrow 301. More often than not, successive write operations write data to successive storage locations. Thus, more often than not, the speculative write operation will be to the correct locations.

While the storage device is getting ready to receive data, as indicated by block 321, the host is getting ready to issue another write command as indicated by block 320. Finally, the host will issue another write command as indicated by the arrow 322. Some time later the host will be ready to transfer data as indicated by arrow 323. By this time the storage device 105 will be ready to receive data. That is, the delay 321 will have been completed.

The bridge 104 will compare the address in the speculative write command 319 to the address in the actual write command 222. If these addresses are identical (as they will frequently be) the data received by the bridge as indicated by the arrow 323 will be transferred from bridge 104 to the storage device 105, as indicated by arrow 324.

The arrow labeled A (on the left side of FIG. 3A) indicates the time delay between when the host 101 indicated data was ready for transfer, as indicated by arrow 303, and when the data was transferred to storage device 105 as indicated by the arrow 208. The arrow labeled B (on the left side of FIG. 3A) indicates the time delay between when the host 101 indicated data was ready for transfer, as indicated by arrow 323, and when the data was transferred to storage device 105 as indicated by the arrow 324.

It is important to note that arrow B is considerably shorter than arrow A. As noted previously, the time periods shown in FIG. 3A are not meant to be exact. It is the relative size of the time periods that the figure is intended to illustrate. In particular, the time period B is shorter than the time period A, hence, some benefit was obtained by the use of a speculative write command.

The exact amount of the benefit will depend upon many factors such as the exact amount of time between when a particular storage device 105 receives a write command and when it is ready to receive data. This delay differs between different types and different brands of disk storage devices. Likewise, the amount of time required by the host to prepare and issue a second write command after issuing a first write commands depends upon the speed of each particular computer and upon the particular application which the computer is executing. However, notwithstanding these above types of variations, the arrow B is shorter than the arrow A, and hence some benefit is obtained by the use a speculative write commands.

Figure 3B:
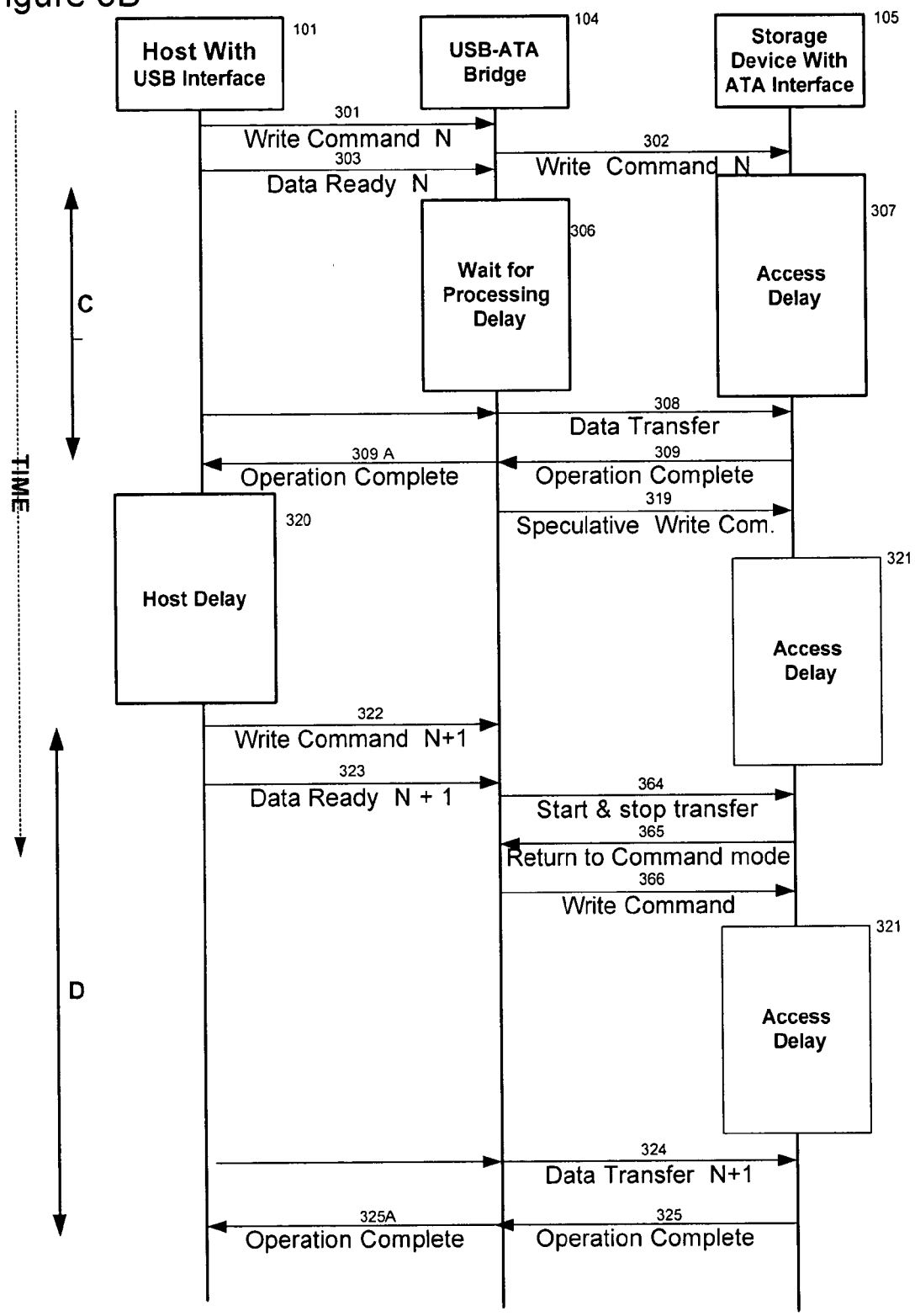
FIG. 3B is a timing diagram illustrating operations that occur when a speculative write command is not successful.

FIG. 3B illustrated what occurs when the bridge detects that the address in a speculative write command is not the same as the address in the next write command that is received by the bridge.

In the sequence of events illustrated in FIG. 3B, the operations that occur as a result of the first write command 301 are identical to those shown in FIG. 3A and explained above. That is, the following operations shown in FIG. 3B are identical to the corresponding commands in FIG. 3A.

a) the write command 301 from the host to the bridge,
    b) the write command 302 from the bridge to the data storage device,
    c) the data ready command 303 from the host,
    d) the data transfer 308,
    e) the operation complete signal 309,
    f) the speculative write command 319,
    g) write command 322, and
    h) the data ready signal 323.

At this point the similarity between the figures ends. In the sequence shown in FIG. 3B, it is assumed that the address in the actual write command 322 differs from the address in the speculative write command 319. This difference is detected by the bridge 104 and it tells the bridge that the speculative write command 319 can not be allowed to proceed to completion.

The bridge 104 aborts the speculative write command, by starting and immediately stopping the data transfer to the storage device in an error conditions. That is, the data transfer is aborted by intentionally injecting CRC errors onto the ATA data bus. This is indicated by the arrow 364.

When the data storage device detects the error signals, it returns to command mode as is conventional. The manner that the disk drive detects the error condition and returns to command mode is conventional.

At this point the speculative write has been aborted and the bridge proceeds with the actual write operation to the address specified by the write command 322. The data is transferred as indicated by arrow 324 and the operation complete signal 325 is issued at the end of the data transfer.

It is noted that the time period required for the first write command is indicated on the left of FIG. 3B by the arrow C. The length of arrow C is the same as the length of arrow A in FIG. 3A. The length of time required for the second write operation is indicated by the arrow D. It is noted that the arrow D is longer than the arrow B and it is in fact longer than the arrows A and C. This indicates that when the speculative write command does not use the address in the succeeding write command, there is a time penalty.

On a statistical basis, and during a normal and typical operation, the system does not pay this penalty very often. On a statistical basis, and during a normal and typical operation, the speculative command can be carried to completion thereby saving time.

Figure 4:
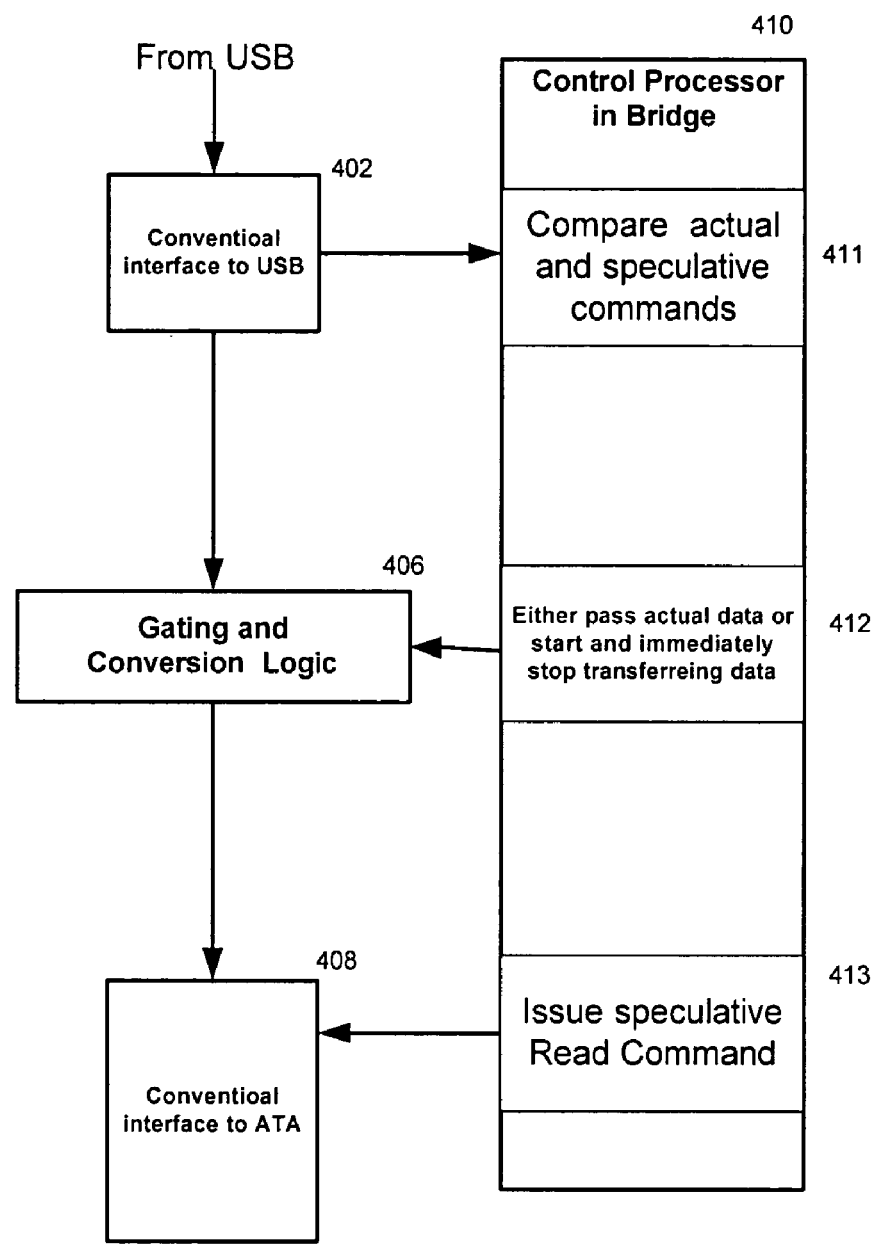
FIG. 4 is a hardware and software block diagram.

FIG. 4 is a block diagram showing an example of the hardware components in bridge circuit 105. The bridge 105 includes a conventional interface 402 to the USB bus and a conventional ATA interface 408. The two interfaces are connected by conventional gating and conversion logic 406.

The operation of the bridge is controlled by a control processor 410. The processor 410 performs various conventional operations and, in the embodiment shown here, it also includes subroutine 411, 412 and 413 to perform various special operations.

Subroutine 213 issues the speculative write command after an actual write command has been completed. This is the command indicated by arrows 319 in FIGS. 3A and 3B.

Subroutine 211 compares the address in the speculative write command and the address in the actual command. If the address in the speculative write command and the address in the actual write command (see arrows 319 and 322 in FIGS. 3A and 3B) are the same, subroutine 212 passes the data associated with the actual write command. If the two addresses differ, subroutine 21 starts and then immediately stops data transfer to the disk storage unit.

The control processor 210 also controls the various other conventional operations that are normally performed by a USB to ATA bridge. These are not specifically shown in FIG. 4.

The following example illustrates the improvement that can be achieved by the present invention in one particular type of system. In a typical 16×DVD system, the present invention can increase the speed of a USB-ATAPI transfer by 200 to 400 microseconds per transfer. With a 50K block size and at 16×DVD speed, this translates to 2300 microseconds. Thus, in such a system, this invention can improves the speed by about 10 to 20 percent. For various other types of disk storage systems, the improvement may be somewhat greater or less than the improvement in the specific example give above.

While the invention has been shown and described with respect to a preferred embodiment thereof, it should be understood that various other embodiments of the invention are possible. Furthermore, it should be understood that various changes in form and detail can be made in the embodiment described above without departing from the scope and spirit of the invention.

I claim:

1. In a bridge between a universal serial bus (USB) connected to a host and an Advanced Technology attachment (ATA) interface connected to a disk storage device, the method of issuing data write commands to said disk storage device in response the actual data write commands received on said USB bus that includes the steps of:
   issuing a speculative write command to said disk storage unit upon the completion of a first actual write command, said speculative storage command directing a write operation to the next successive address after said first actual write command,
   comparing the address in the next actual write command after said first actual write command to the address in said speculative write command,
   transferring data from said next actual write command to said disk storage unit to complete said speculative write command if said comparison detects identical addresses, and
   aborting said speculative write command if said comparison detects different addresses.

2. The method recited in claim 1 wherein said disk storage device is a magnetic hard drive.

3. The method recited in claim 1 wherein said disk storage device is an optical CD drive.

4. The method recited in claim 1 wherein said disk storage device is an optical DVD drive.

5. The method recited in claim 1 wherein said USB bus conforms to the USB 2.0 specifications.

6. The method recited in claim 1 wherein said abort step is performed by initiating a data transfer and immediately stopping said data transfer in an error condition.

7. The method recited in claim 6 wherein said disk drive detects said error condition and in response thereto returns to command mode.

8. The method recited in claim 1 wherein said abort step is performed by sending CRC errors to said storage device.

9. The method recited in claim 6 wherein said Storage device includes an ATA data bus and said abort step is performed by injecting CRC errors onto the ATA bus.

10. The method recited in claim 1 including the step of storing data at the address specified by said next actual write command if said comparison detects different addresses.

11. A method of operating a bridge which receives data write commands from a host via a USB connection and which issues data write commands to a storage device, each of said write commands specifying that data be stored at a particular address, said method including,
   generating a speculative write command which directs the storage of data at an address that is sequential to the address specified in a previous write request,
   comparing the address in subsequent actual write request received from said host to the address in said speculative write request, and
   transmitting to said storage device data specified by said actual write request to complete said speculative write request if said addresses are the same.

12. The method recited in claim 11 which includes the step of aborting said speculative write request if the address specified in said speculative write request and the address specified in said subsequent actual write request differ.

13. The method recited in claim 12 that includes writing data to the address specified in said subsequent actual write request.

14. The method recited in claim 12 wherein said speculative write request is aborted by sending CRC errors to said storage device.

15. The method recited in claim 11 wherein said storage device includes an ATA interface.

16. The method recited in claim 12 wherein said storage device includes an ATA interface with an ATA data bus and said abort step includes transmitting a CRC error on said ATA data bus.

17. A bridge device which receives data write commands from a host via a USB connection and which issues data write commands to a storage device, each of said write commands specifying that data be stored at a particular address, said bridge device including,
   means for generating a speculative write command which directs the storage of data at an address that is sequential to the address specified in a previous write request,
   comparison means for comparing the address in subsequent actual write request received from said host to the address in said speculative write request, and
   means for transmitting to said storage device data from said actual write request to complete said speculative write request if said addresses are the same.

18. The bridge device recited in claim 17 including:
   means for aborting said speculative write request if said comparison means detects different addresses.

19. The bridge device recited in claim 17 wherein said storage device includes an ATA interface.

20. The bridge device recited in claim 17 wherein said storage device includes an ATA interface with an ATA data bus and said means for aborting includes means for transmitting a CRC error on said ATA data bus.

* * * * *